A. P. SCHNEIDER.
BONE FORK.
APPLICATION FILED MAY 23, 1910.
993,720.
Patented May 30, 1911.
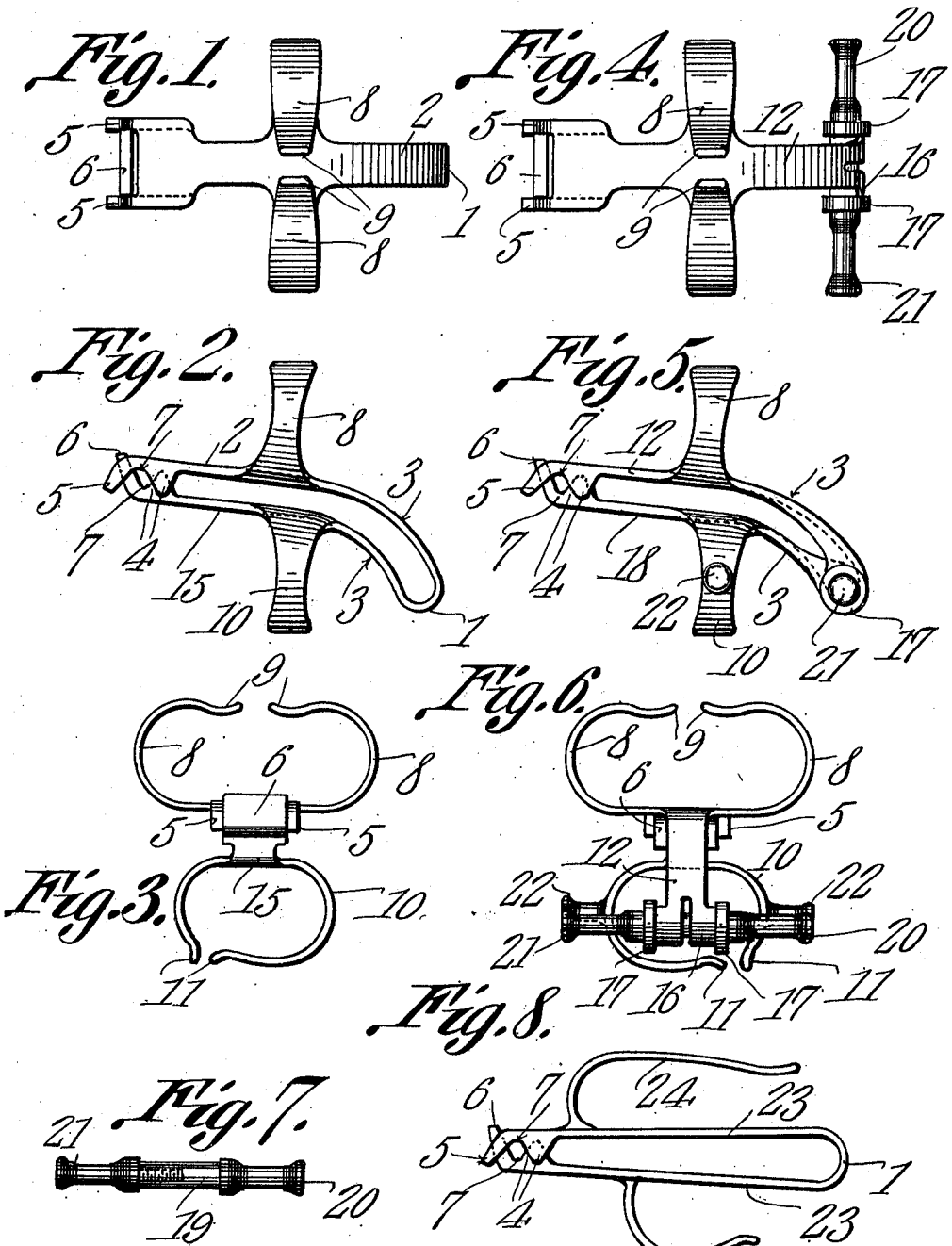

UNITED STATES PATENT OFFICE.

ADOLPH PHILLIP SCHNEIDER, OF CATASAUQUA, PENNSYLVANIA.

BONE-FORK.

993,720.   Specification of Letters Patent.   Patented May 30, 1911.

Application filed May 23, 1910. Serial No. 562,884.

*To all whom it may concern:*

Be it known that I, ADOLPH P. SCHNEIDER, a citizen of the United States, residing at Catasauqua, in the county of Lehigh and State of Pennsylvania, have invented a new and useful Bone-Fork, of which the following is a specification.

It is the object of this invention to provide a bone fork of novel and improved construction, resembling in general contour, a pair of pliers, and adapted to be employed in removing bones and adhering meat, from a common platter to an individual plate; the device being likewise adapted to be employed for holding a bone while the meat thereon is being gnawed therefrom; and adapted, moreover, to hold a bone in place upon an individual plate, while the meat upon the bone is being severed therefrom by a knife or the like.

With the above and other objects in view, the invention consists in the novel construction and arrangement of parts hereinafter described, delineated in the drawings, and specifically pointed out in that portion of this instrument wherein patentable novelty is claimed for certain distinctive and peculiar features of the device, it being understood that, within the scope of what is claimed, divers changes in the form, proportions, size, and minor details of the structure may be made, without departing from the spirit of the invention or sacrificing any of the advantages thereof.

Similar numerals of reference are employed to denote corresponding parts through the several figures of the drawings.

In the accompanying drawings,—Figure 1 is a top plan showing one form of the invention; Fig. 2 is a side elevation of the form of the invention delineated in Fig. 1; Fig. 3 is an end elevation of the form shown in Figs. 1 and 2, the device being viewed from the free ends of its constitutent arms; Fig. 4 is a top plan of a modified form of the invention; Fig. 5 is a side elevation of the device delineated in Fig. 4; Fig. 6 is an end elevation of the form of the invention shown in Figs. 4 and 5, the device being viewed from the connected ends of its constituent arms; Fig. 7 is a detailed plan of the pivot pin whereby the arms are connected in Figs. 4, 5 and 6; and Fig. 8 is a side elevation of a modified form of the invention.

Referring to that form of the invention which is depicted, in Figs. 1, 2 and 3, it will be seen that the same is fashioned from a single strip of resilient metal bent, sharply upon itself, as denoted by the numeral 1, to form arms 2 and 15. Adjacent the point 1, the arms 2 and 15 are curved in a common direction, as shown at 3.

The free ends of the arms 2 and 15 are provided, upon their remote edges, with flanges 4, extended toward each other, the flanges 4 of the arm 15 being located out of alinement with the flanges 4 of the arm 2, and adapted to register between the last named flanges. Between its flanges 4, the arm 2 is bifurcated to form spaced fingers 5, and, between its flanges 4, the arm 15 is terminally provided with an upstanding tongue 6, adapted to register between the fingers 5 of the arm 2. In the flanges 4 of both arms 2 and 15, there are coöperating notches 7, adapted to form a bone-receiving opening in the arms 2 and 15, when, as shown in Fig. 2, the arms are brought together.

Upon the arm 2, about midway between its ends, resilient strips 8 are located. These strips 8 may, if desired, be fashioned integrally with the arm 2. As seen most clearly in Fig. 3, the ends 9 of the strips 8 are carried toward each other, to overhang the arm 2, the opening between the ends 9 of the strips 8 being located in substantial alinement with the arm 2. Strips 10, likewise resilient, and preferably fashioned integrally with the arm 15 extend in opposite directions from the remote edges of the arm 15. The ends 11 of the strips 10 are carried toward each other, as seen to best advantage in Fig. 3, the opening between the ends 11 being located slightly to one side of the longitudinal center of the device.

Sometimes, the device is fashioned as shown in Figs. 4, 5 and 6. In such instance, the arm 12 is provided at one end with a head 16, adapted to register between ears 17 upon the other arm 18. A pivot pin is passed through the head 16 and through the ears 17, in order to effect a hinge joint between the arms 12 and 18. As seen most clearly in Fig. 7, this pivot pin comprises a socket containing member 19, upon one end of which is a knob 20. A similar knob 21 is shown, the same having a threaded shank adapted to register in the socket containing member 19. The socket containing member 19 is first thrust through the head 16 and through the ears 17, whereupon the threaded end of the knob 21 is rotated into engagement with the socket containing member 19.

To the strip 10, oppositely disposed, outstanding knobs 22 are secured. The outermost portions of the strips 8 are located in common planes with the end of one of the knobs 22 and the end of the knob 21, upon the one hand, and with the end of the other knob 22 and the end of the knob 20 upon the other hand. By this construction, three supporting points are provided upon each side of the device, so that the same may be rested upon a table cloth, without necessitating the soiled end of the device being brought into contact with the table cloth.

If desired the device may be fashioned as shown in Fig. 8. In such case, the arms 23 are straight, instead of curved as in the preceding forms, the device, however, like the form shown in Fig. 1, being fashioned from a single strip of resilient material. A strip 24 is secured at one end to the arm 23 and extends longitudinally of the arm 23 at a slight distance therefrom. A strip 25 is similarly mounted upon the other arm 23, this last mentioned strip 25 being, however, somewhat shorter than the strip 24. In this form of the invention, both of the strips 24 and 25 extend longitudinally of the arms 23, instead of transversely thereof, as shown in the preceding figures.

In all of the forms of the invention, the index and second finger of the hand are inserted beneath the strips which protrude from one arm, while the thumb is inserted beneath the strip which protrudes from the other arm. In the forms shown in Figs. 1 and 4, the fingers and the thumb will extend longitudinally of the implement, while in the form shown in Fig. 8, the fingers and the thumb will extend transversely of the implement. The curvature denoted by the numeral 3, enables the butt of the tool to fit neatly in the hand of the operator. In the forms shown in Figs. 1 and 8, the device is so constructed that the gripping elements at the free ends of the arms will normally be held together; a spring is coiled about the stud in space X, Fig. 6. This spring is fastened to arms 12 and 18 (Fig. 5) and keeps the fork closed normally. It is opened against the pressure of this spring.

From the foregoing it will be seen that I have provided a bone fork of simple construction, whereby pieces of flesh, or bones with adhering flesh may be manipulated by a person who is eating, without necessitating the soiling of his fingers in the operation.

Having thus described the invention, what is claimed is:—

1. In table tongs, arms provided with laterally extended elements for the reception of the thumb and finger of the operator; and a pivot element connecting the arms and terminally extended beyond the arms to coöperate with said elements in providing a three-point support for the tongs.

2. In table tongs, arms provided with laterally extended elements for the reception of the thumb and finger of the operator; and a pivot element connecting the arms and terminally extended beyond the arms to coöperate with said elements in providing a three-point support for the tongs; both arms being curved in a common direction, in the plane of movement of said arms, adjacent the place of pivotal union of said arms, to adapt the tongs to the position of the hand of the user when the fingers of the hand are engaged in said elements.

In testimony that I claim the foregoing as my own, I have hereto affixed my signature in the presence of two witnesses.

ADOLPH PHILLIP SCHNEIDER.

Witnesses:
E. N. Walter,
S. H. Kitts.

---

Copies of this patent may be obtained for five cents each, by addressing the "Commissioner of Patents, Washington, D. C."